US012584782B2

(12) United States Patent
Kochan, II et al.

(10) Patent No.: US 12,584,782 B2
(45) Date of Patent: Mar. 24, 2026

(54) HIGH DENSITY BASKET SCALES AND SYSTEMS USING THE SAME

(71) Applicant: PAR Excellence Systems, Inc., Cincinnati, OH (US)

(72) Inventors: Thomas J. Kochan, II, Brighton, MI (US); Stanley S. Copeland, Saint Louisville, OH (US); Thaddeus MacKrell, Gross Pointe City, MI (US)

(73) Assignee: PAR Excellence Systems, Inc., Cincinnati, OH (US)

( * ) Notice: Subject to any disclaimer, the term of this patent is extended or adjusted under 35 U.S.C. 154(b) by 0 days.

(21) Appl. No.: 19/237,914

(22) Filed: Jun. 13, 2025

(65) Prior Publication Data

US 2025/0383229 A1 Dec. 18, 2025

Related U.S. Application Data

(60) Provisional application No. 63/659,651, filed on Jun. 13, 2024.

(51) Int. Cl.
G01G 21/28 (2006.01)
G01G 19/52 (2006.01)
(Continued)

(52) U.S. Cl.
CPC ............. G01G 19/52 (2013.01); G01G 21/22 (2013.01); G01G 21/28 (2013.01); G01G 23/18 (2013.01);
(Continued)

(58) Field of Classification Search
CPC ........ H02G 3/04; H02G 3/0475; H02G 11/00; H02G 11/006; G01G 19/4144;
(Continued)

(56) References Cited

U.S. PATENT DOCUMENTS 5,348,485 A * 9/1994 Briechle ................ H01R 25/14
439/121
5,671,362 A * 9/1997 Cowe ........................ G07F 7/00
340/568.1
(Continued)

FOREIGN PATENT DOCUMENTS

CN 110304396 A * 10/2019 ............. B65G 69/04
CN 112220289 A * 1/2021 ............. G01G 19/42
(Continued)

OTHER PUBLICATIONS

Computer translation of CN_112336086 (Year: 2025).*
(Continued)

*Primary Examiner* — Randy W Gibson
(74) *Attorney, Agent, or Firm* — FBT GIBBONS LLP

(57) ABSTRACT

The present invention relates to a basket scale assembly, the basket scale assembly including a cable management assembly and a scale. The cable management assembly includes a cable chain assembly, a rail clip attached to the cable chain assembly, a cable track assembly attached to the cable chain assembly, a bottom attachment configured to receive the cable track assembly, and a top attachment configured to connect to the bottom attachment. The cable management assembly further includes a plurality of wires configured to be received by the cable track assembly. The scale includes a bottom plate, at least one load cell aligned with the bottom plate and configured to measure a weight, a plurality of top plates mounted to the bottom plate, and a circuit board being configured to receive signals from the at least one load cell.

20 Claims, 10 Drawing Sheets

(51) Int. Cl.

| | |
|---|---|
| *G01G 21/22* | (2006.01) |
| *G01G 23/18* | (2006.01) |
| *G06Q 10/08* | (2024.01) |
| *H02G 3/04* | (2006.01) |
| *H02G 11/00* | (2006.01) |
| *G01G 19/414* | (2006.01) |

(52) U.S. Cl.
CPC ............. *H02G 3/04* (2013.01); *H02G 3/0475* (2013.01); *H02G 11/00* (2013.01); *G01G 19/4144* (2013.01); *G06Q 10/08* (2013.01)

(58) Field of Classification Search
CPC ........ G01G 21/28; G01G 19/52; G01G 21/22; G01G 23/18; G06Q 10/08
See application file for complete search history.

(56) References Cited

U.S. PATENT DOCUMENTS

| | | | | |
|---|---|---|---|---|
| 6,639,156 B2* | 10/2003 | Luke | .................... | G06Q 10/087 |
| | | | | 705/28 |
| 7,975,464 B2* | 7/2011 | Komiya | ............... | H02G 3/0475 |
| | | | | 248/51 |
| 8,549,831 B2* | 10/2013 | Dunham | .............. | H02G 11/006 |
| | | | | 248/51 |
| 9,418,267 B1* | 8/2016 | Josey | ............... | G06K 19/07749 |
| 10,746,589 B1* | 8/2020 | Danenberg | ........... | H05K 5/0073 |
| 11,528,991 B2* | 12/2022 | Zheng | .................. | A47B 96/025 |
| 2005/0171854 A1* | 8/2005 | Lyon | .................... | G06Q 20/209 |
| | | | | 705/24 |
| 2012/0031684 A1* | 2/2012 | Schon | .................... | G01G 21/28 |
| | | | | 177/25.12 |
| 2016/0048798 A1* | 2/2016 | Meyer | .................... | G01G 19/42 |
| | | | | 705/28 |
| 2022/0128295 A1* | 4/2022 | Wei | ........................ | F25D 23/021 |
| 2025/0042347 A1* | 2/2025 | Isoda | ....................... | H02G 3/04 |

FOREIGN PATENT DOCUMENTS

| | | | | | |
|---|---|---|---|---|---|
| CN | 112263101 A | * | 1/2021 | ........ | G05B 19/0423 |
| CN | 112336086 A | * | 2/2021 | ............ | G01G 19/62 |
| DE | 102013113180 A1 | * | 6/2014 | ........... | H02G 3/0475 |

OTHER PUBLICATIONS

Computer translation of DE 102013113180 (Year: 2025).*
Computer translation of CN_110304396_A (Year: 2025).*
Computer translation of CN_112220289_A (Year: 2025).*
Computer translation of CN_112263101_A (Year: 2025).*

* cited by examiner

HIGH DENSITY BASKET SCALES AND SYSTEMS USING THE SAME

CROSS REFERENCE TO RELATED APPLICATION

This application claims the priority benefit of U.S. Provisional Patent Application No. 63/659,651, filed Jun. 13, 2024, which is hereby incorporated herein by reference in its entirety.

BACKGROUND

Medical supplies must be able to be stored, inventoried, and accessed in places like hospitals, medical offices, and nursing facilities. In a typical hospital, medical products may be stored in a closet or storage room. For example, a hospital typically stores hundreds of sutures in cabinets or on racks. At any given time, a variety of medical supplies must be readily available for use by a doctor, nurse, or other medical professional. High density storage systems utilize a plurality of racks in a cabinet and a plurality of scales on a rack to optimize space, handle heavier loads, and continuously monitor hospital inventory.

Basket scales integrated into high density storage units for medical devices are designed to accurately weigh items placed within baskets. These scales are typically equipped with high-precision sensors and digital displays, allowing healthcare professionals to measure the weight of the medical supplies, devices, or equipment quickly and conveniently. Basket scales provide accurate weight measurements, which are crucial for inventory management, medication dosing, and other medical procedures.

Basket scales are typically only compatible with specific storage units or fixtures designed to accommodate them. This results in a fixed configuration and size of the basket scales, making them less accommodating to various functions and changes in use. Further, they often require complex installation procedures that are time-consuming, costly, and prone to error.

DESCRIPTION OF DRAWINGS

While the specification concludes with claims which particularly point out and distinctly claim the invention, it is believed the present invention will be better understood from the following description of certain examples taken in conjunction with the accompanying examples and figures.

Figure 1:
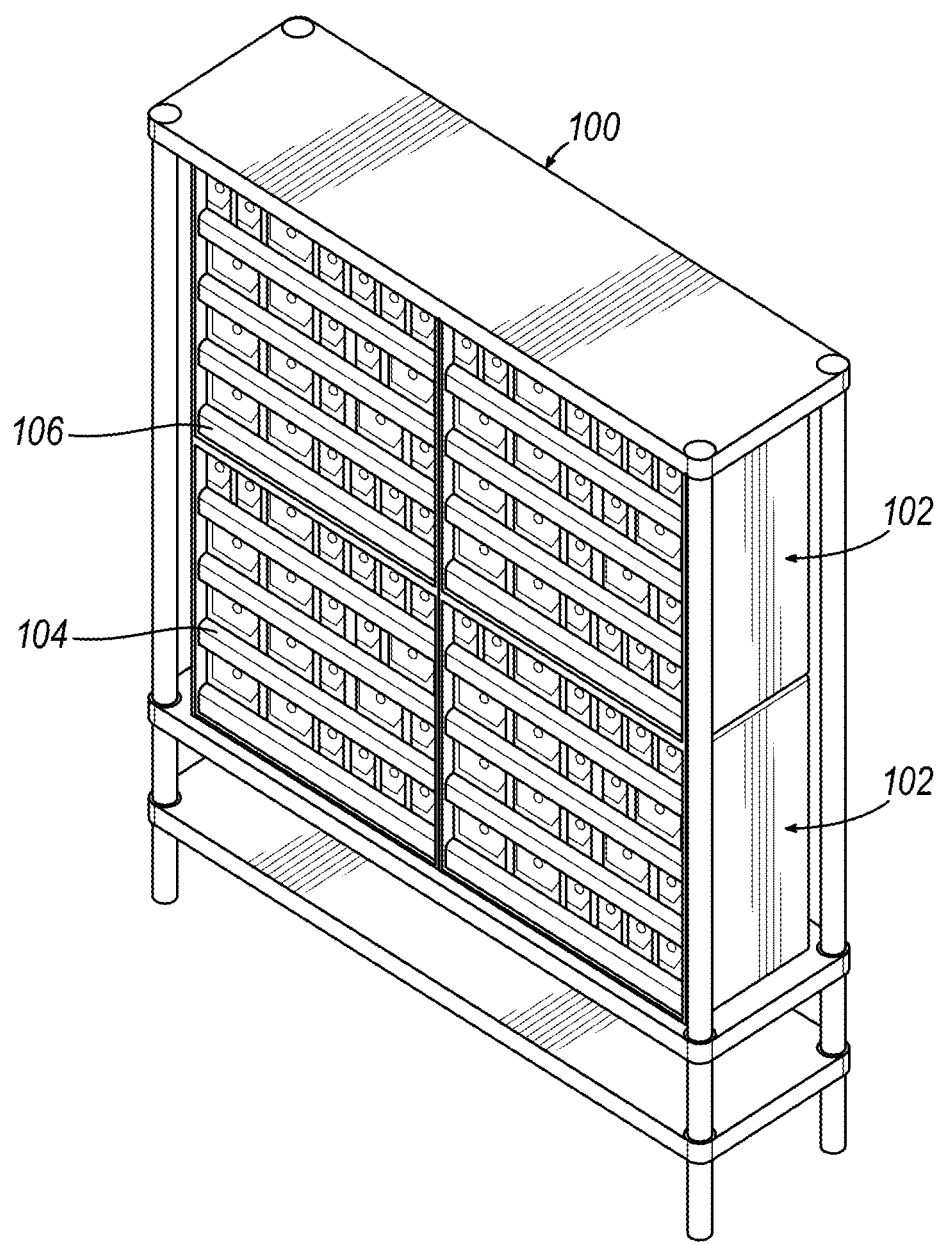
FIG. 1 is a perspective view of an exemplary storage system in accordance with an embodiment of the present invention.

The figures are not intended to be limiting in any way, and it is contemplated that various embodiments of the invention may be carried out in a variety of other ways. The accompanying figures incorporated in and forming a part of the specification show aspects of the present invention, and together with the description serve to explain the principles of the invention; it being understood, however, that this invention is not limited to what is shown in the figures.

DETAILED DESCRIPTION

The following description of certain examples of the invention should not be used to limit the scope of the present invention. Other examples, features, aspects, embodiments, and advantages of the invention will become apparent to those skilled in the art from the following description. As will be realized, the invention is capable of other different and obvious aspects, all without departing from the invention. Accordingly, the examples, figures, and descriptions should be regarded as illustrative in nature and not restrictive.

I. Exemplary High-Density Basket Scales

The following description details modular, high density basket scales for use with a high-density storage system for containing medical supplies. While standard basket scales and storage systems are used to store medical supplies, high-density iterations feature multiple tiers of baskets stacked vertically to optimize space and handle heavier loads. For the purposes of this application, "storage units" refer to high-density storage units, and "basket scale" refer to high-density basket scales to be used in high-density storage units.

Basket scales of the present disclosure can be integrated into storage units for medical devices. Basket scales of the present disclosure are designed to accurately weigh items placed within the baskets. In some examples, a basket scale may be placed along the bottom of a basket, wherein the basket may be placed on a rack within a cabinet. In other embodiments, a basket scale may be attached to a rack, wherein a plurality of racks may be positioned within at least one cabinet. A plurality of holders may be configured to hold at least one container containing medical supplies, and each of the holders may be supported by a respective one of the basket scales.

In some contexts, using basket scales fixed into a storage unit presents challenges. For instance, a basket scale only compatible with a specific storage unit designed to accommodate it may have a limited use. Further, available basket scales have a fixed configuration and size. This lack of flexibility may not adequately accommodate a hospital's varying needs or changes in desired uses. For instance, a hospital may want to change what medical instrument a certain basket scale is measuring or may want to rearrange the configuration of a storage unit that includes a plurality of basket scales. Such changes or rearranging may be difficult or impossible with fixed basket scales. Most available basket scales also require complex, time-consuming installation procedures. As technology advances, a fixed basket scale may become outdated by becoming incompatible with newer storage units or software systems. As will be discussed further below, modular basket scales may provide scalability and flexibility to overcome these challenges.

In one or more embodiments, a basket scale of the present disclosure includes a bottom plate. The bottom plate can be placed along the bottom of the inside of a basket for storing medical supplies. In some examples, the bottom plate may be made of plastic. In other examples, the bottom plate may be made of stainless steel or any other suitable material.

In one or more embodiments, a basket scale of the present disclosure can include a plurality of load cells aligned with the bottom plate. Load cells are sensors that detect the weight placed on the weighing platform. Load cells convert the applied force into an electrical signal that can then be processed to determine the weight of the medical devices being stored within the basket.

In one or more embodiments, a basket scale of the present disclosure further includes a top plate. The top plate can be mounted on the bottom plate. In some examples, the top plate may include vacuum-formed plastic in order to prevent unwanted flexing of the top plate and to provide the top plate with radial supports. In some embodiments, the top plate may be mounted on the bottom plate with screws.

In one or more embodiments, a basket scale of the present disclosure further includes a circuit board. The circuit board may be configured to automatically monitor the inventory of the basket and communicate information to a network, which can then be monitored by hospital personnel either via a display screen, desktop, or through a mobile application. The circuit board may further connect with a controller. For instance, if the basket scale has an error, such as measuring a negative weight or measuring a weight that does not correspond to a certain known number of medical devices stocked in the basket, then the controller may notify hospital staff or a third party. The circuit board may further connect to a software interface that allows a user to log data, integrate the basket scale with computer systems, or remotely monitor the basket scales. These functions allow a hospital to track inventory more efficiently and more accurately. For instance, a medical professional may be able to check the availability of a certain medical device without physically engaging with the storage unit system that the device is being kept in. Instead, the medical professional may check the device's availability from a computer that is in another wing of the hospital, or from a mobile device such as a tablet.

In one or more embodiments, a basket scale of the present disclosure may further include wiring configured to connect the load cells to the circuit board and other electronic components of the basket scale. These connections made by the wiring facilitate easy assembly, disassembly, and maintenance of the basket scale. In some embodiments, the wiring may facilitate communication between the load cells and a software interface or controller.

In one or more embodiments, a basket scale of the present disclosure may further include a digital display unit. The digital display unit may serve as an electronic label and may display electronic text for a medical professional to read. For example, an electronic label could display the total weight of the inventory being measured by the basket scale, or the number of devices being measured by the basket scale, or the title of the instruments being measured by the basket scale. A digital display unit may further include a plurality of buttons or controls for operation.

In one or more embodiments, a basket scale of the present disclosure may further include a control panel. In some basket scales, there may be a separate control panel for configuring settings, calibrating the scale, or accessing additional features.

In one or more embodiments, the bottom plate may include a plurality of adjustable feet. The plurality of adjustable feet may be used to level the scale and ensure accurate weight measurements are being taken. The plurality adjustable feet may be adjusted to compensate for uneven surfaces and to ensure proper alignment of the bottom plate. In some embodiments, the plurality of adjustable feet may be adjustable mounting feet that are configured to fit into a plurality of mounting holes on each shelf of the storage unit. In such embodiments, the adjustable mounting feet near the front of the scale are spaced apart from each other by a predetermined distance similar to the distance between the mounting holes near the front of each shelf of the storage unit. The same relationship exists between the adjustable mounting feet near the rear of the scale and the mounting holes near the rear of each shelf of the storage unit.

In one or more embodiments, each adjustable foot of the plurality of adjustable feet includes an enlarged portion and a narrow portion. The enlarged portion of each adjustable foot of the plurality of adjustable feet may have a cross dimension similar to that of the enlarged portion of each mounting hole in each shelf of the storage unit, and the narrow portion of each mounting foot may have a cross dimension similar to that of the narrow portion of each mounting hole in each shelf of the storage unit. In this manner, the enlarged portion of each mounting hole and the weighing platform may be slid across a shelf with the narrow portion of the adjustable foot received in the narrow portion of the mounting hole to lock the weighing portion in place. Thus, one or more basket scales may be selectively positioned at various horizontal locations along the shelves in a storage unit or cabinet.

In one or more embodiments, the basket scales of the present disclosure may include an illuminator configured to activate and light up if certain conditions are met. For instance, the illuminator may light up the basket scale measuring a basket of medical instruments that a nurse needs to retrieve, or the basket scale that may be experiencing an error. The illuminator may flash different flash rates or different colors to communicate different messages to hospital staff.

II. Cable Management Assembly

FIG. 1 shows an exemplary storage unit system (100) configured such that baskets (106) are stored in drawers (108) on a rack (102). For example, rack (102) may include one or more cabinets (104), each including one or more drawers (108). Drawers (108) may be configured to hold one or more baskets (106). Baskets (106) may be configured to fit in existing commercial drawers. In an embodiment, drawer (108) or cabinet (104) may be retrofit to continuously monitor inventories of supplies.

Figure 2:
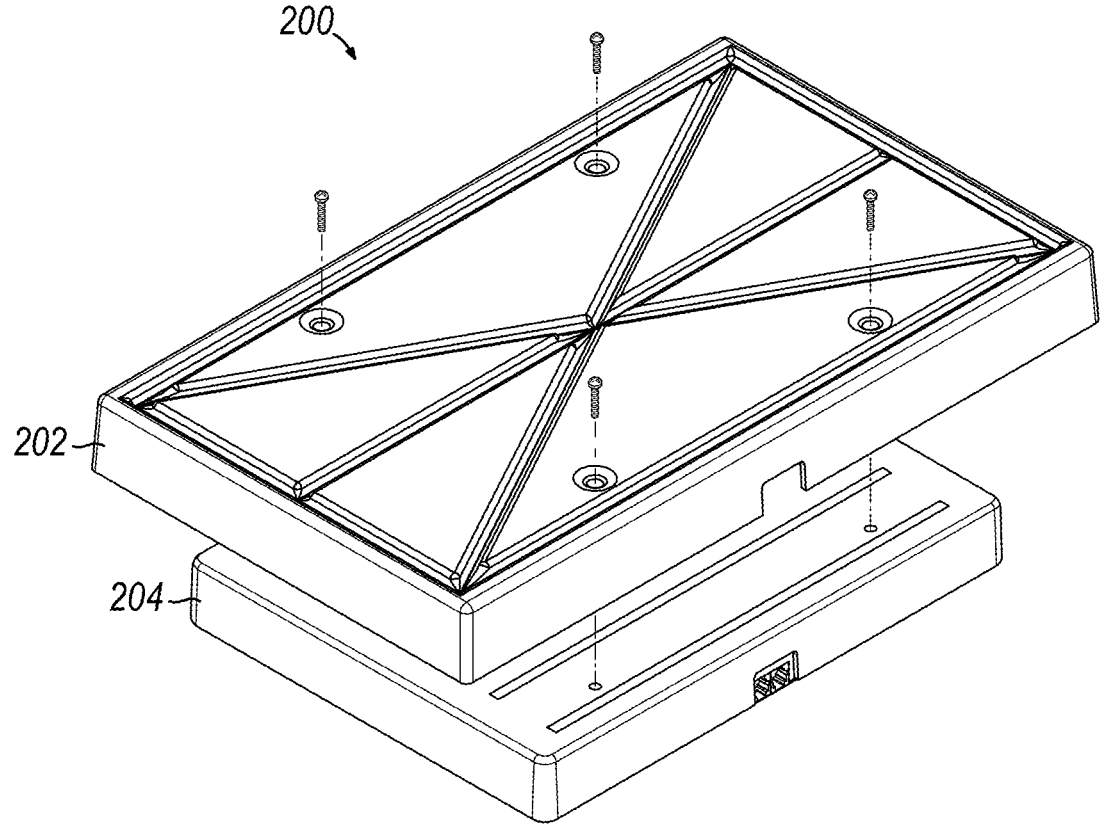
FIG. 2 is a perspective view of a basket scale with a one-scale configuration.

FIG. 2 shows a perspective view of a basket scale (200) with a one-scale configuration. In one or more embodiments, basket scale (200) with a one-scale configuration includes a top plate (202) mounted on one platform scale (204). In some examples, top plate (202) may include vacuum-formed plastic in order to prevent unwanted flexing of the top plate (202) and to provide the top plate (202) with radial supports. In some embodiments, top plate (202) may be mounted on the platform scale (204) with screws. Platform scale (204) may include stainless steel, injection molded polycarbonate, plastic, or combination thereof. In some embodiments, basket scale (200) may measure between 0 and 25 kilograms in inventory.

Figure 3:
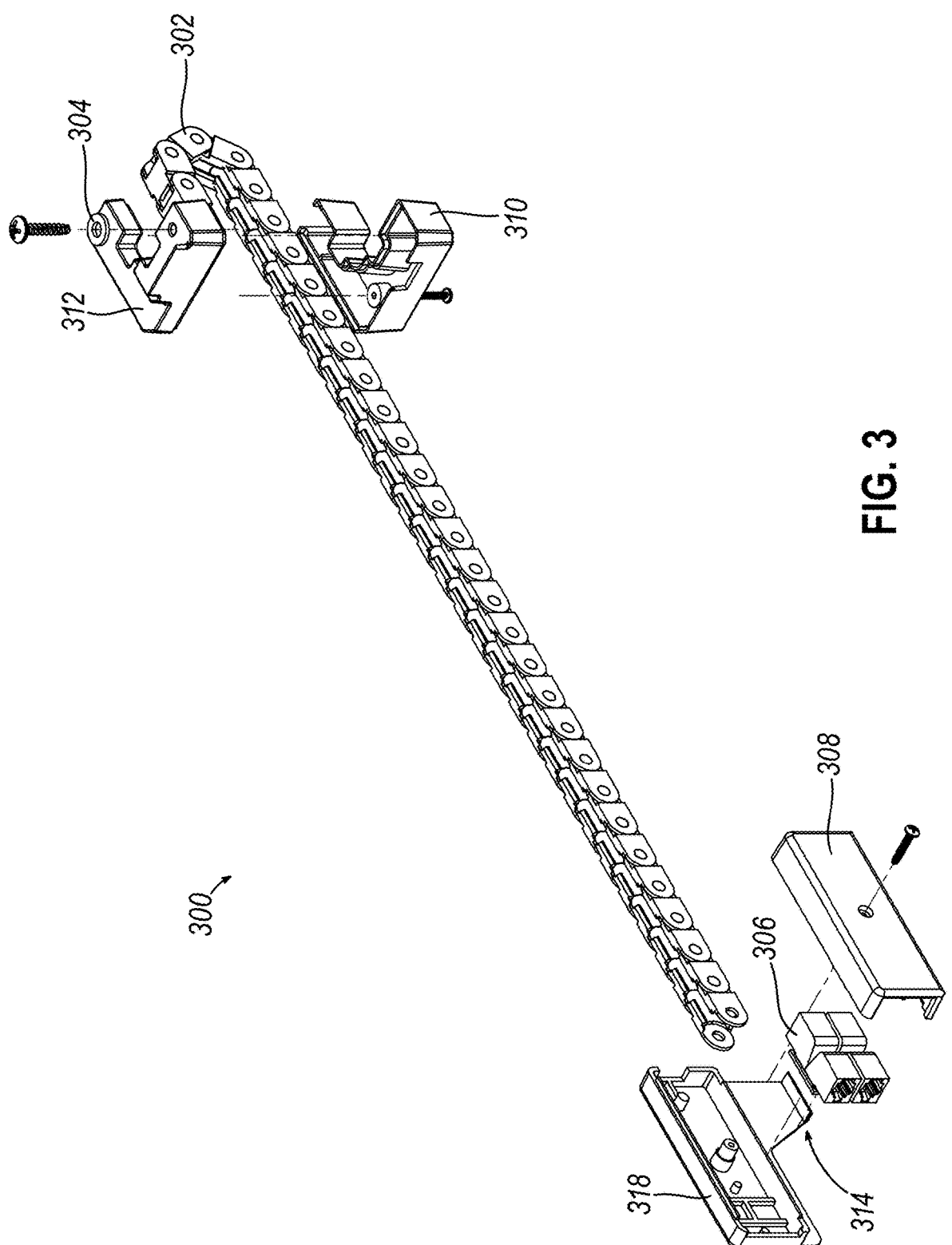
FIG. 3 is a perspective view of a cable management assembly designed to mount to a DSI™ basket cable.

FIG. 3 shows an embodiment of a cable management assembly (300) designed to mount to a DSI™ basket cable.

Figure 5B:
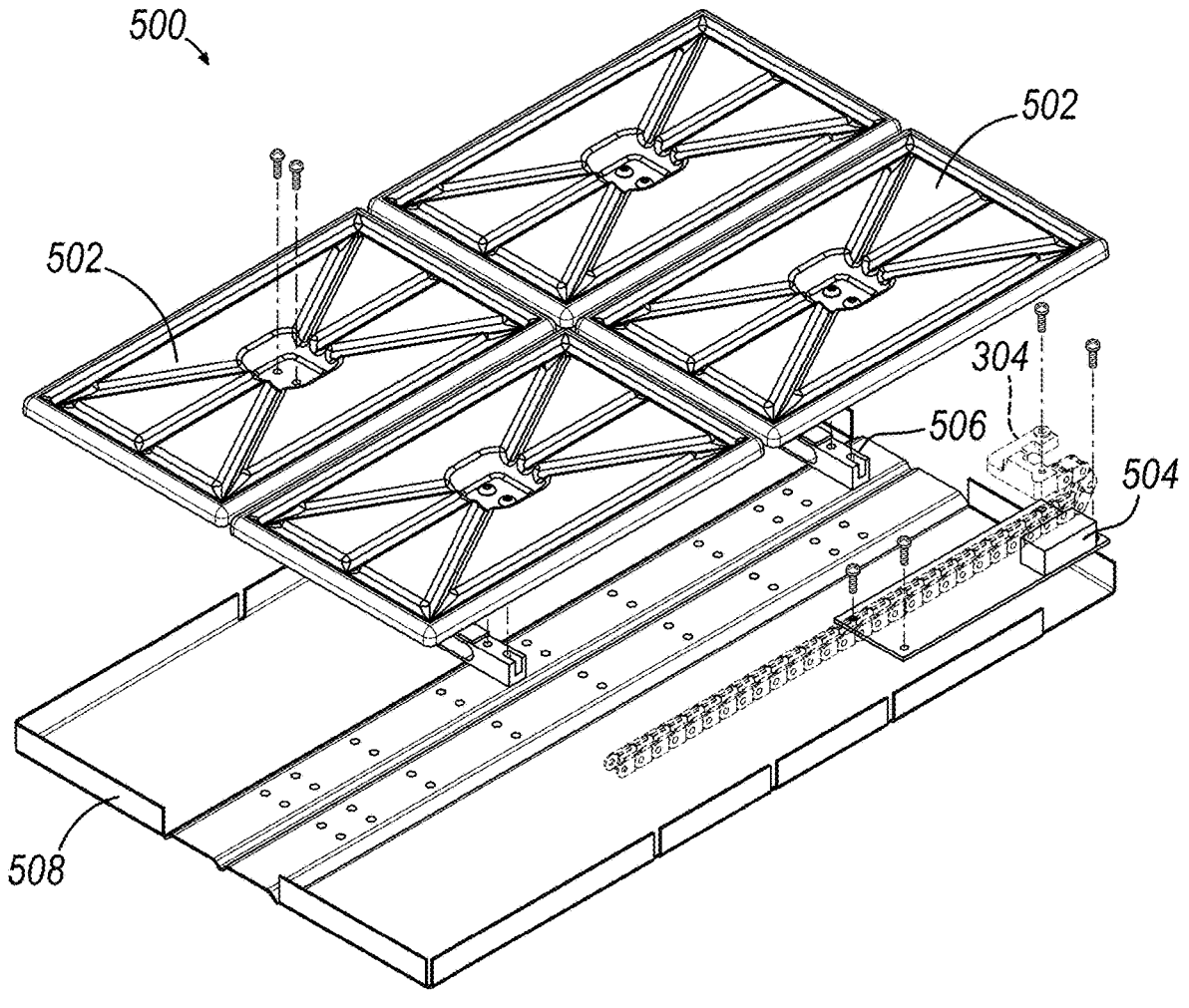
FIG. 5B is a perspective view of the basket scale of FIG. 5A connected to a cable management assembly.

The cable management assembly (300) includes a cable chain assembly (302) configured to encapsulate a plurality of one-wire cables (304). The plurality of one-wire cables (304) serves to both power a series of basket scales (200) in, for example, a storage unit system (100) and to facilitate communication between basket scales (200) and a controller. Cable management (300) assembly is connected to basket scale (200) such that plurality of one-wire cables (304) are connected to basket scale (200) such as shown in FIGS. 5B, 6B, and 7B.

Cable management assembly (300) further includes a cable track (306), wherein the cable track (306) can be configured to receive the plurality of one-wire cables (304).

Cable management assembly (300) further includes a rail clip lid (308), wherein rail clip lid (308) may be configured to connect cable chain assembly (302) to a rail clip (318) on a shelf or rack within storage unit system (100). In one or more embodiments, rail clip lid (308) faces away from cable track (306). In one or more embodiments, cable management assembly (300) may also include a bottom attachment (310) configured to receive cable track (304), and a top attachment (312) configured to connect to bottom attachment (310), thereby encapsulating cable track (306). Bottom attachment (310) may be connected to rack (102) and top attachment may be connected to a basket (106). In some embodiments, cable track (306) allows for basket (106) to move freely in and out of storage unit system (100).

In one or more embodiments, cable management assembly (300) helps organize and secure cables, thus preventing the cables from tangling or becoming damaged during use. Further, cable management assembly (300) allows for baskets (106) to extend and retract from storage unit system (100) as needed while keeping scales plugged in and also keeping scales from interfering with scale measurements.

In one or more embodiments, cable management assembly (300) can be configured to mount basket scales (200) to DSI™ basket cables. In such an embodiment, the chain assembly includes a lip (314) that holds rail clip lid (308) in place.

Figure 4:
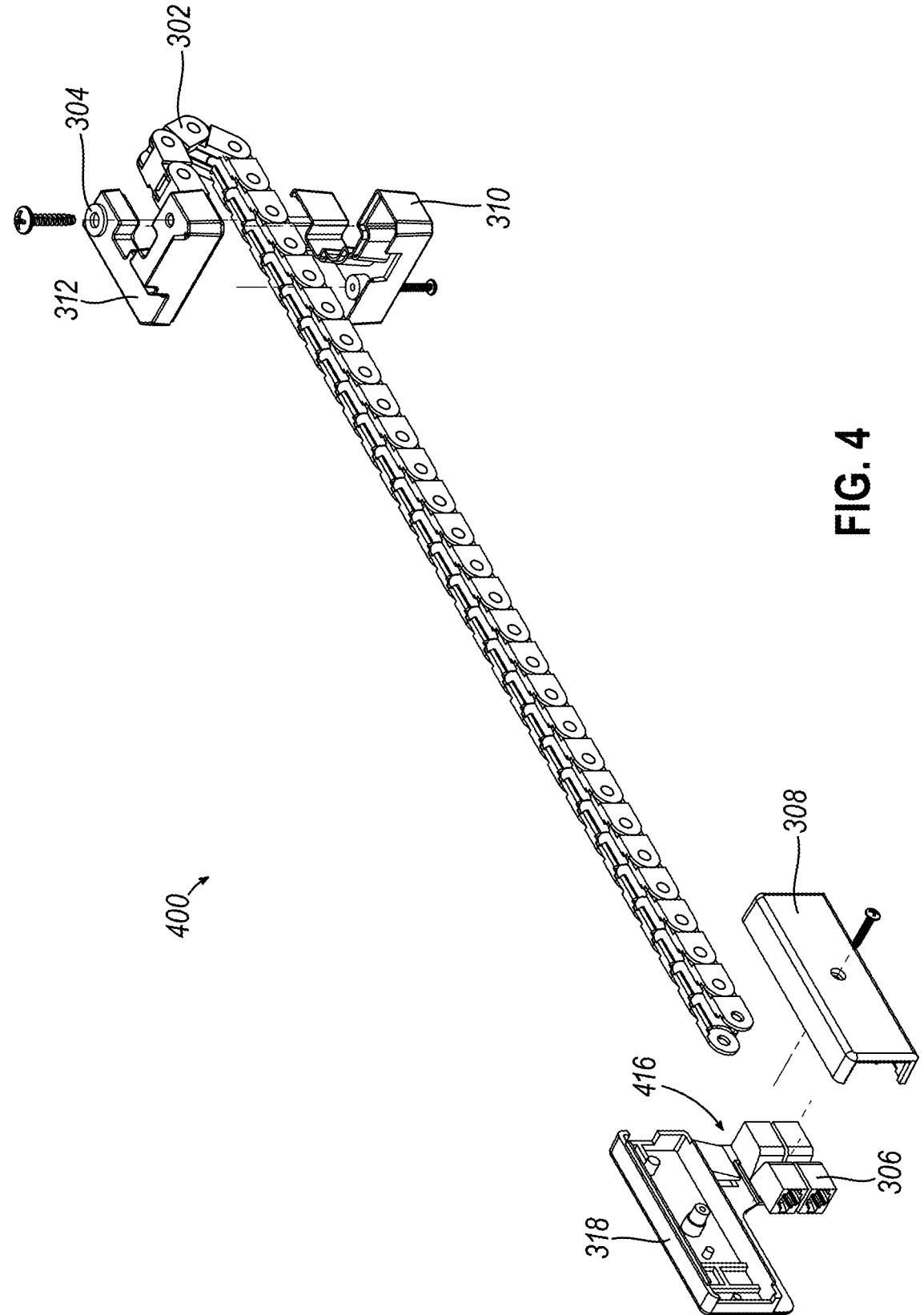
FIG. 4 is a perspective view of a cable management assembly designed to mount to a Pegasus™ basket cable.

FIG. 4 shows an embodiment of a cable management assembly (400) designed to mount to a Pegasus™ basket cable. Cable management assembly (400) may be nearly identical to cable management assembly (300), with the only difference being that, instead of lip (314) holding rail clip lid (308) in place, a plastic slot (416) holds rail clip lid (308) in place. In one or more embodiments, plastic slot (416) may be formed by a split piece of plastic.

Because cable management assembly (300) can connect basket scales (200) to different basket cables in various storage systems, cable management assembly (300) provides basket scales (200) with greater scalability. For instance, basket (106) may be easily slid out to be removed from storage unit system (100) and slid back in. Removing basket (106) from storage unit system (100) may stop items from being measured by basket scale (200). After the proper number of medical devices have been removed by a medical professional, basket (106) may be slid back into storage unit system (100), wherein basket scales (200) can automatically resume measuring the inventory and can update for the new number of items.

Cable management assembly (300) therefore enables customization and adaptation to specific requirements. For example, a hospital might choose different sizes or types of weighing platforms depending on the medical instruments they need to weigh. A plurality of basket scales (200) can be integrated with a variety of storage fixtures, such as cabinets, shelves, racks, or carts, without requiring significant modifications, complex installation, or further purchases. Hospitals can expand their storage capabilities by adding more basket scales as needed without the need to replace entire storage systems to do so. This further provides for easier maintenance and servicing of the scales since individual components can be accessed for cleaning, calibration, or repair.

In one or more embodiments, cable management assembly (300) may connect a plurality of basket scales (200) to storage unit system (100). For example, a common storage unit system is a cabinet with racks. Another common storage unit system can be a cabinet with shelves. When using such a cabinet, cable management system (300) can be connected to a removable rail in rack (102) with rail clip lid (308). In some embodiments, rail clip lid (308) can be attached to a rail in rack (102) with an adhesive. In some embodiments, rail clip lid (308) can be attached to a rail in rack (102) with a snap fit fastener. Then, top attachment (312) can be mounted to basket (106) above rail clip lid (308). In some examples, top attachment (312) can be mounted basket (106) with washers and screws.

In one or more embodiments, cable management assembly (300) can be daisy-chained to connect a plurality of basket scales (200) in storage unit system (100). In such an embodiment, cable management assembly (300) connects a plurality of basket scales (200) in storage unit system (100) to a controller. In one or more embodiments, the two ends of cable chain assembly (300) include a plurality of circuit chain assemblies configured to communicate messages to a controller about basket scales (200) connected along cable management assembly (300). In some embodiments, the two ends of cable chain assembly (300) create a loop from a controller to basket scales (200). In one or more embodiments, one controller may be configured with multiple racks of a storage unit system when cable chain assembly (300) connects multiple racks in a loop to a controller.

In yet other embodiments, basket scales (200) may be connected with a wireless connection, such as Bluetooth or another wireless technology, instead of with a cable management assembly. Such embodiments may include a battery to power basket scales (200), thus removing the plurality of wires or chains. A wireless system of basket scales (200) may be most useful in environments with a lower risk of connection issues than a hospital floor, such as a warehouse, clinical building, or a hospital basement.

III. Modular Basket Scale Configuration

The basket scales of the present disclosure may be aligned in at least four different configurations: a one-scale configuration, as seen in FIG. 2; a four-scale configuration; a six-scale configuration; and an eight-scale configuration.

Figure 5A:
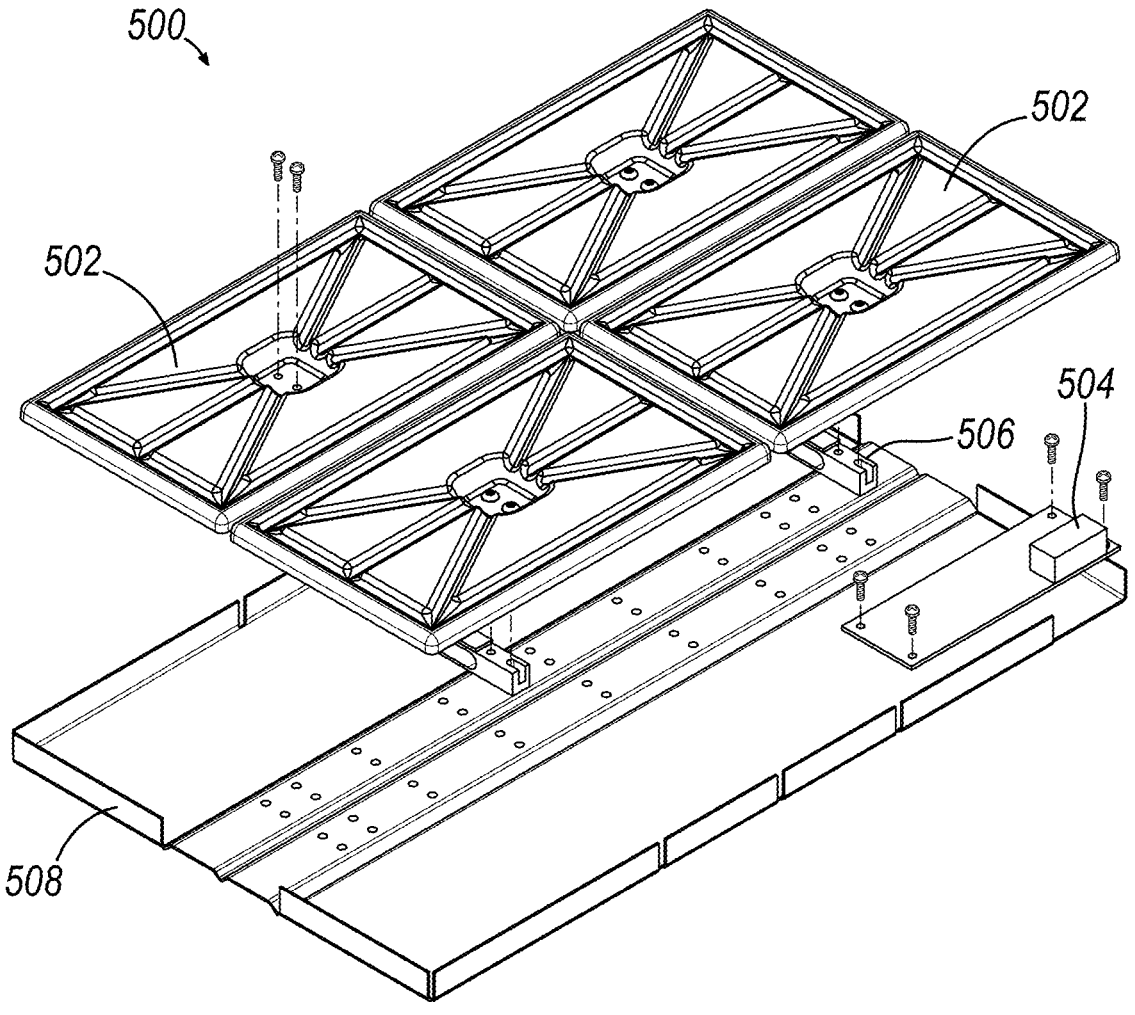
FIG. 5A is a perspective view of a basket scale with a four-scale configuration.

FIG. 5A shows perspective view of a basket scale (500) with a four-scale configuration. In one or more embodiments, basket scale (500) with a four-scale configuration includes four load cells (506) configured onto a bottom plate (508), wherein bottom plate (508) may be aligned with the four load cells (506). In some embodiments, the four load cells (506) can be screwed into bottom plate (508). Bottom plate (508) may include stainless steel, injection molded polycarbonate, plastic, or combinations thereof. In one or more embodiments, a basket scale (500) further includes a circuit board (504) screwed onto the corner of bottom plate (508). Load cells may include load cell wires connected to circuit board (504). In some embodiments, load cell wires are connected to circuit board (504) with connectors. In yet other embodiments, load cell wires may further be secured with zip ties. In one or more embodiments, basket scale (500) includes four top plates (502) mounted on bottom plate (508) with screws. In some examples, the top plates (502) may include plastic in order to prevent unwanted flexing of top plates (502) and to provide top plates (502) with radial supports. Basket scale may measure between 0 and 5 kilograms in inventory.

Figure 6A:
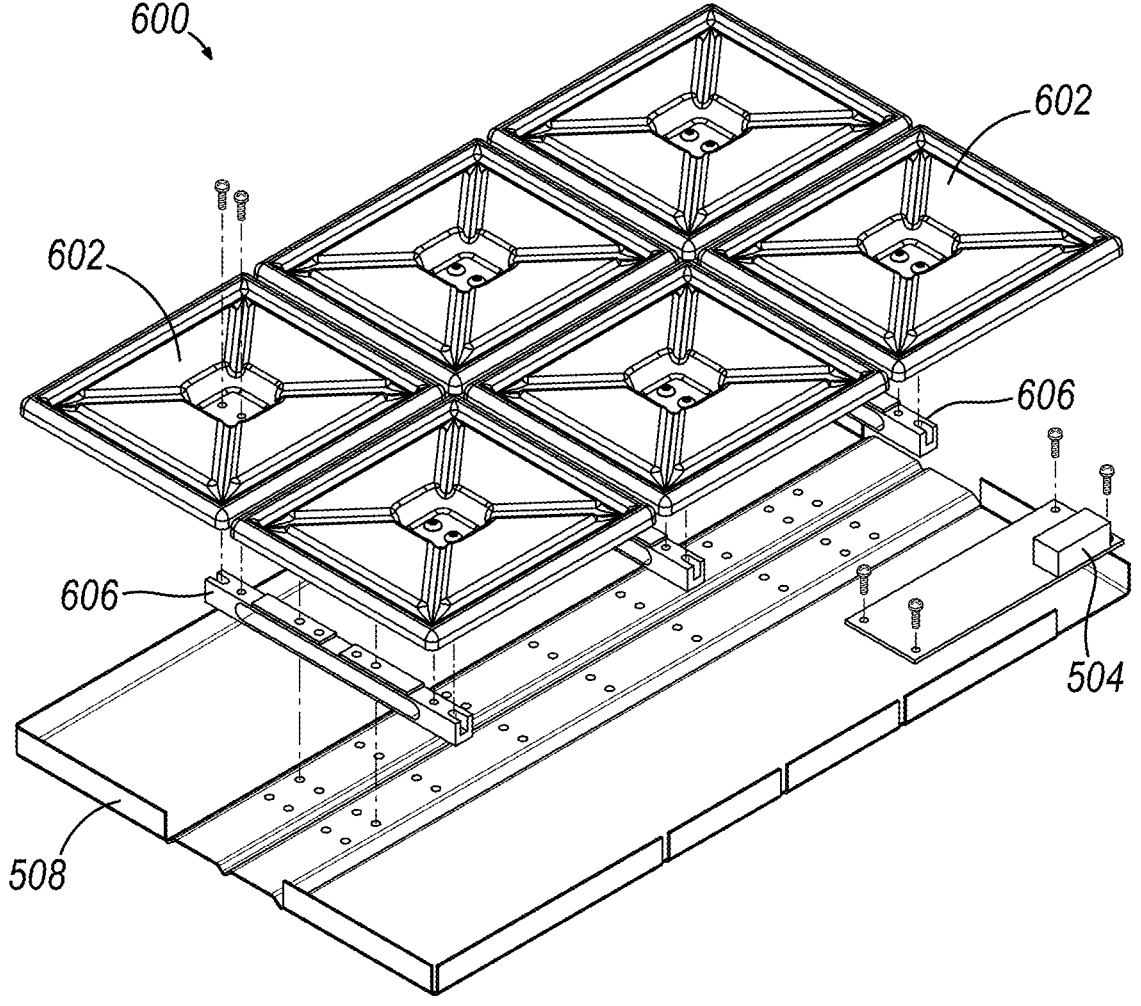
FIG. 6A is a perspective view of a basket scale with a four-scale configuration.
Figure 6B:
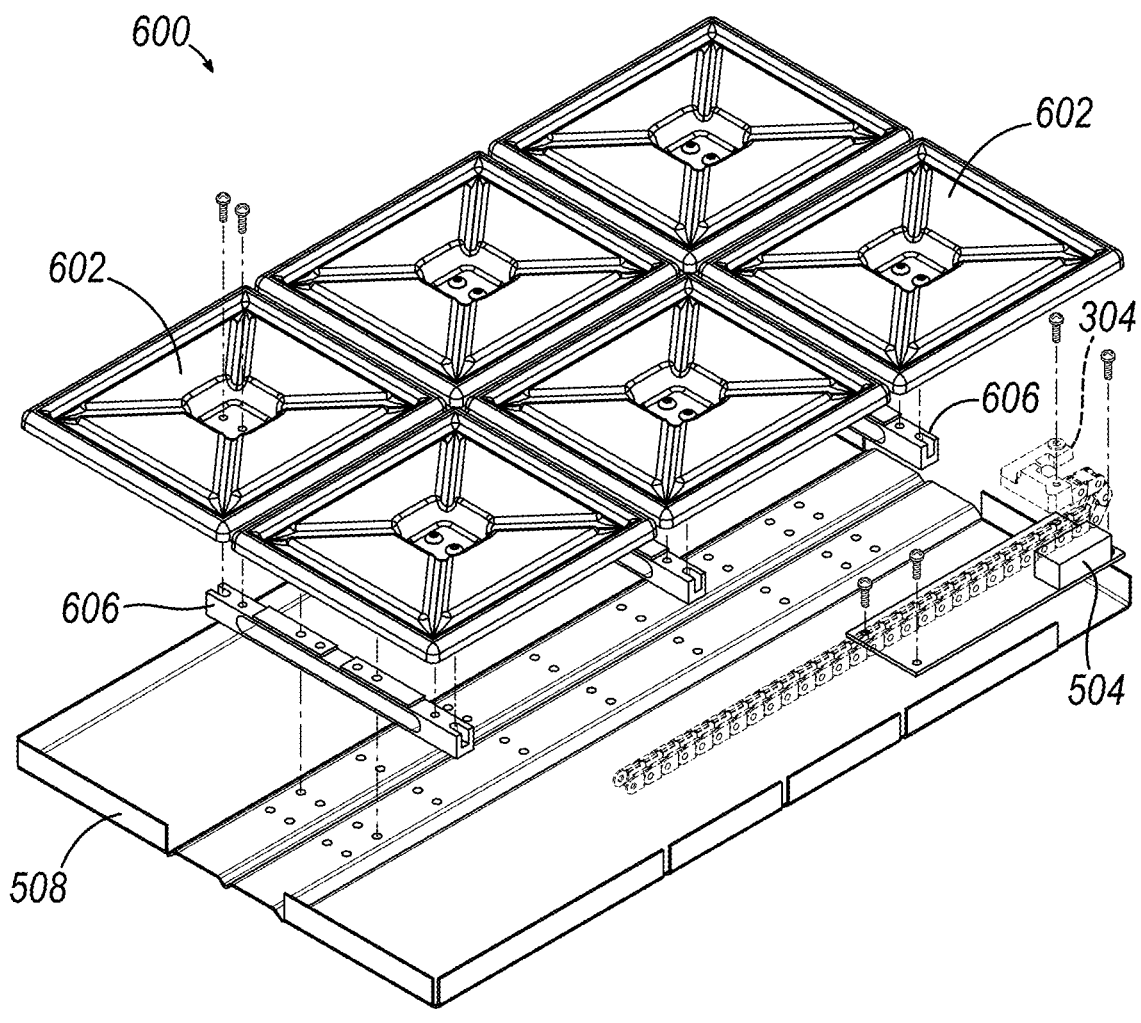
FIG. 6B is a perspective view of the basket scale of FIG. 6A connected to a cable management assembly.

FIG. 6A shows a perspective view of basket scale (600) with a six-scale configuration. In one or more embodiments, basket scale (600) has a nearly identical configuration as the basket scale (500), except basket scale (600) may be configured with six load cells (606) and six top plates (702).

Figure 7A:
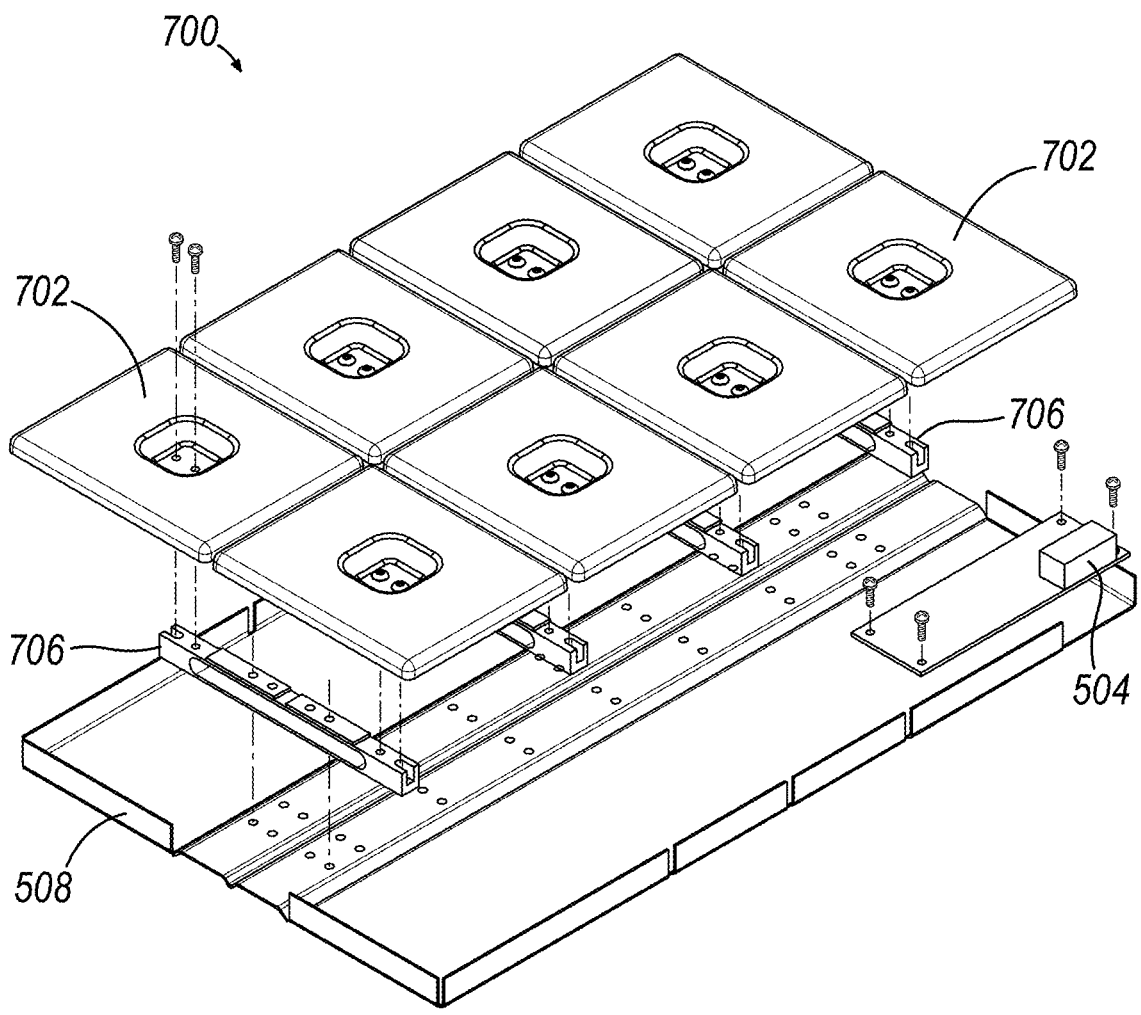
FIG. 7A is a perspective view of a basket scale with a four-scale configuration.
Figure 7B:
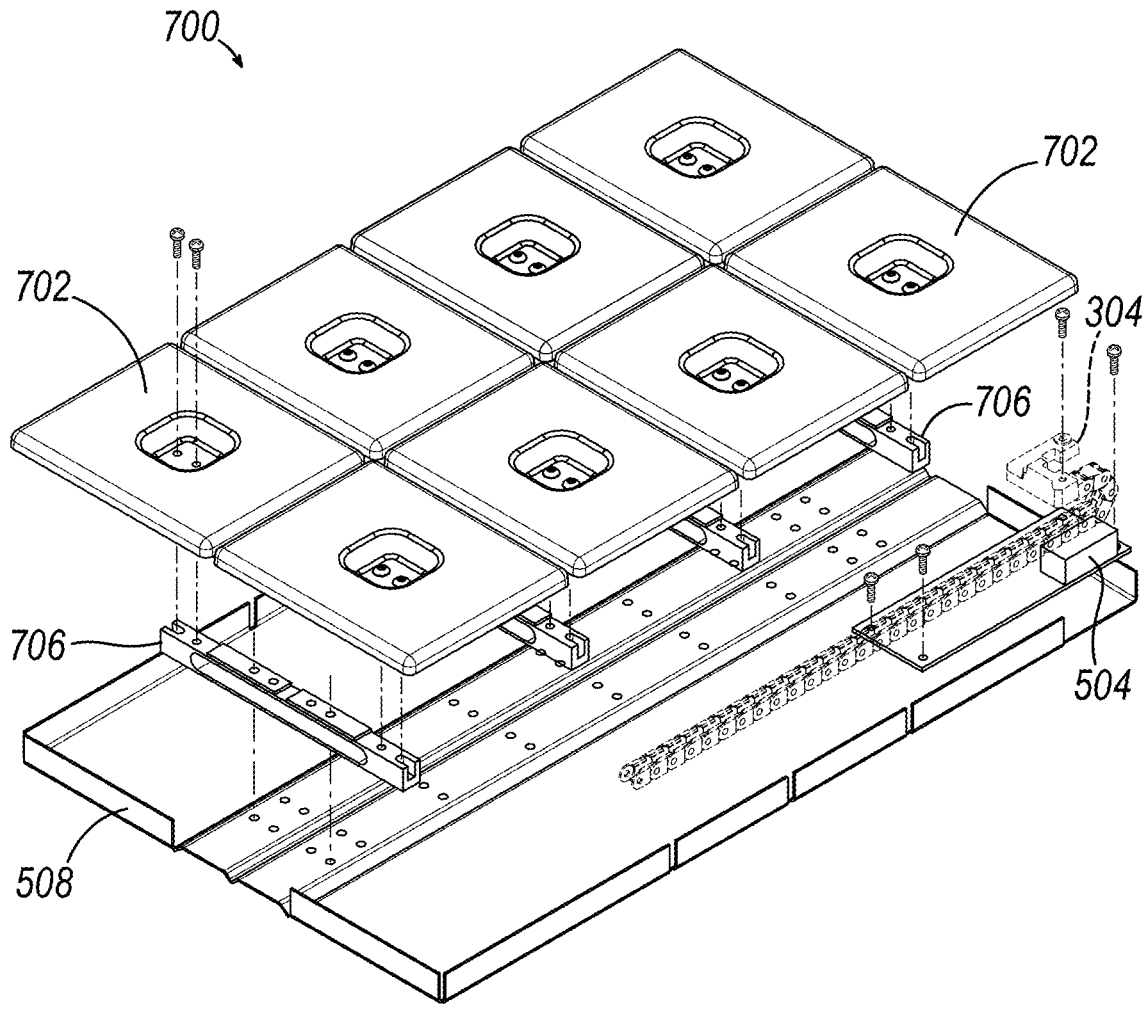
FIG. 7B is a perspective view of the basket scale of FIG. 7A connected to a cable management assembly.

FIG. 7A shows a perspective of basket scale (700) with an eight-scale configuration. In one or more embodiments, basket scale (700) has a nearly identical configuration as basket scale (500) and basket scale (600), except basket scale (700) may be configured with eight load cells (706) and eight top plates (702).

Stock-keeping units (SKUs) refer to unique codes or identifiers assigned to each distinct item in inventory management. SKUs are used to track and manage inventory efficiently. Each SKU typically corresponds to a specific product, such as a particular type of medical device. SKUs help healthcare facilities keep track of quantities of each product they have in stock, enabling them to replenish items as needed to avoid shortages or overstocking. When orders are placed for medical supplies, SKUs are used to identify the exact items requested, ensuring accurate picking and packing of orders.

By allowing for these different configurations, a medical professional may use any of the basket scales as an individual scale, or any two adjacent basket scales as tandems. In one or more embodiments, this means that two basket scales may be used for one item. As a result, any number between 1 and 8 stock-keeping units may be used in the baskets. In some embodiments, dividers may be used to separate inventory as desired.

Because the basket scales of the present disclosure are modular and have these different configurations, components can easily be assembled or rearranged with ease. For example, a hospital may simply change the configuration from a four-scale configuration basket scale to an eight-scale configuration based on the volume of inventory or the size of stock-keeping units being stored. This may allow for more efficient, customized, and cost-effective storage of medical inventory. Further, a modular basket scale in any configuration that needs to be replaced can simply be replaced by a different modular basket scale, as opposed to needing to replace an entire rack or storage system.

The basket scales of the present disclosure may be horizontally spaced apart from each other on a rack by suitable distances to accommodate various medical devices. In one or more embodiments, one or more basket scales may be removed from an original location on the rack and repositioned at a new location on the rack to adjust the horizonal spacing of the basket scales. Such modularity may allow a single rack to be suitable for various applications. In one or more embodiments, a rack of a storage unit may be configured to hold up to four basket scales carrying four stock-keeping units, or up to eight basket scales carrying eight stock-keeping units, or various numbers of basket scales carrying different varieties of stock-keeping units.

While the basket scales of the present disclosure have been shown and described as being mounted on respective racks in a generally horizontal orientation, it will be appreciated that the holders and basket scales may be mounted in any suitable orientation. For example, one or more holders and respective basket scales may be mounted at an angle of 45 degrees relative to horizontal, such as to retrofit a pre-existing sloping shelving system or cart with the holders and scales. In such cases, the basket scales may be calibrated at the same angle relative to horizontal, such as 45 degrees, so that the sloped orientation of the basket scales during calibration may compensate for weight errors that may otherwise occur if the scales were calibrated in a generally horizontal orientation.

IV. Exemplary Combinations

Example 1

A basket scale assembly, the basket scale assembly including: (a) a cable management assembly, the cable management assembly including: (i) a cable chain assembly, (ii) a rail clip lid, the rail clip lid being configured to attach the cable chain assembly to a storage unit system, (iii) a cable track assembly, the cable track assembly being configured to attach to the cable chain assembly, (iv) a bottom attachment, the bottom attachment being configured to receive the cable track assembly, (v) a top attachment, the top attachment being configured to connect to the bottom attachment, and at the opposite end of the cable chain assembly as the top attachment, and (v) a plurality of wires, the plurality of wires configured to be received by the cable track assembly; and (b) a scale, the scale including: (i) a bottom plate, (ii) at least one load cell, the at least one load cell being aligned with the bottom plate, the at least one load cell being configured to continuously measure a weight, (iii) a plurality of top plates, the plurality of top plates being mounted to the bottom plate, and (vi) a circuit board, the circuit board being configured to receive signals from the at least one load cell.

Example 2

The basket scale assembly of Example 1, wherein the scale includes four load cells and four top plates.

Example 3

The basket scale assembly of Example 1, wherein the scale includes six load cells and six top plates.

Example 4

The basket scale assembly of Example 1, wherein the scale includes eight load cells and eight top plates.

Example 5

The basket scale assembly of Example 1, wherein the cable management assembly can be configured to attach to a storage unit system.

Example 6

The basket scale assembly of Example 5, wherein the rail clip lid can be configured to attach to a rack of a storage unit system.

Example 7

The basket scale assembly of Example 5, wherein the at least one load cells transmit signals to the circuit board.

Example 8

The basket scale assembly of Example 5, wherein the cable management assembly includes a lip, the lip being configured to hold the rail clip lid in place.

Example 9

The basket scale assembly of Example 6, wherein the cable management assembly includes a slot, the slot being configured to hold the rail clip lid in place.

Example 10

The basket assembly of Example 1, wherein the basket scale assembly includes a control panel.

Example 11

The basket scale assembly of Example 11, wherein the cable management system can be connected to the control panel.

Example 12

The basket scale assembly of Example 12, wherein the cable management assembly communicates information from the scale to the control panel.

Example 13

The basket scale assembly of Example 1, wherein the cable management assembly can be configured to be daisy-chained to another cable management assembly.

Example 14

The basket scale assembly of Example 1, wherein the basket assembly includes adjustable feet.

Example 15

The basket scale assembly of Example 1, wherein the basket scale assembly includes a display screen.

Example 16

The basket scale assembly of Example 1, wherein the basket scale assembly includes dividers, wherein the dividers are configured to separate items.

Example 17

The basket scale assembly of Example 1, wherein the basket scale assembly includes an illuminator.

Example 18

The basket scale assembly of Example 1, wherein the plurality of top plates may include plastic.

Example 19

A basket scale assembly, the basket scale assembly including: (a) a cable management assembly, the cable management assembly including: (i) a cable chain assembly, (ii) a rail clip lid, the rail clip lid being configured to attach the cable chain assembly to a storage unit system, (iii) a cable track assembly, the cable track assembly being configured to attach to the cable chain assembly, (iv) a bottom attachment, the bottom attachment being configured to receive the cable track assembly, (v) a top attachment, the top attachment being configured to connect to the bottom attachment, and at the opposite end of the cable chain assembly as the top attachment, and (v) a plurality of wires, the plurality of wires configured to be received by the cable track assembly; and (b) a scale, the scale including: (i) a platform scale; and (ii) a top plate, the top plate being configured to be mounted on the platform scale.

Example 20

A storage system, the storage system including: (a) at least one cabinet; (b) a plurality of racks positioned within the at least one cabinet; (c) the basket scale assembly of Example 1, the basket scale assembly configured to attach to at least one of the racks; and (d) a plurality of holders, the plurality of holders being configured to hold at least one container containing medical supplies, each of the holders being supported by the basket scale assembly.

V. Conclusion

It should be understood that any one or more of the teachings, embodiments, examples, etc. described herein may be combined with any one or more of the other teachings, embodiments, examples, etc. that are described herein. The following-described teachings, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various examples of the present invention, further adaptations of the methods and systems described herein may be accomplished by appropriate modifications by one of ordinary skill in the art without departing from the scope of the present invention. Accordingly, the scope of the present invention should be considered in terms of the following claims and is understood not to be limited to the details of structure and operation shown and described in the specification and drawings.

We claim:

1. A basket scale assembly, the basket scale assembly including:

(a) a cable management assembly, the cable management assembly including:

(i) a cable chain assembly, (ii) a rail clip lid, the rail clip lid being attached to the cable chain assembly, (iii) a cable track assembly, the cable track assembly being configured to attach to the cable chain assembly, (iv) a bottom attachment, the bottom attachment being configured to receive the cable track assembly, (v) a top attachment, the top attachment being configured to connect to the bottom attachment, and (vi) a plurality of wires, the plurality of wires configured to be received by the cable track assembly; and (b) a scale, the scale including:

(i) a bottom plate, (ii) at least one load cell, the at least one load cell being aligned with the bottom plate, the at least one load cell configured to continuously measure a weight, (iii) a plurality of top plates, the plurality of top plates being mounted to the bottom plate, and (iv) a circuit board, the circuit board being configured to receive signals from the at least one load cell, wherein the cable management assembly is connected to the scale such that the plurality of wires are connected to the scale, and wherein the cable management assembly further includes mounting features configured to attach the cable management assembly to different types of storage unit systems.

2. The basket scale assembly of claim 1, wherein the scale includes four load cells and four top plates.

3. The basket scale assembly of claim 1, wherein the scale includes six load cells and six top plates.

4. The basket scale assembly of claim 1, wherein the scale includes eight load cells and eight top plates.

5. The basket scale assembly of claim 1, wherein the cable management assembly is configured to attach to a storage unit system.

6. The basket scale assembly of claim 5, wherein the rail clip lid is configured to attach to a rack of a storage unit system.

7. The basket scale assembly of claim 5, wherein the at least one load cells transmit signals to the circuit board.

8. The basket scale assembly of claim 5, wherein the mounting features include a lip, the lip being configured to hold the rail clip lid in place.

9. The basket scale assembly of claim 5, wherein the mounting features include a slot, the slot being configured to hold the rail clip lid in place.

10. The basket scale assembly of claim 1, wherein the basket scale assembly includes a control panel.

11. The basket scale assembly of claim 10, wherein the cable management assembly is connected to the control panel.

12. The basket scale assembly of claim 11, wherein the cable management assembly communicates information from the scale to the control panel.

13. The basket scale assembly of claim 1, wherein the cable management assembly is configured to be daisy-chained to another cable management assembly.

14. The basket scale assembly of claim 1, wherein the basket scale assembly includes adjustable feet.

15. The basket scale assembly of claim 1, wherein the basket scale assembly includes a display screen.

16. The basket scale assembly of claim 1, wherein the basket scale assembly includes dividers, wherein the dividers are configured to separate items.

17. The basket scale assembly of claim 1, wherein the basket scale assembly includes an illuminator.

18. The basket scale assembly of claim 1, wherein the plurality of top plates are comprised of plastic.

19. A basket scale assembly, the basket scale assembly including:

(a) a cable management assembly, the cable management assembly including:

(i) a cable chain assembly, (ii) a rail clip lid, the rail clip lid being attached to the cable chain assembly, (iii) a cable track assembly, the cable track assembly being configured to attach to the cable chain assembly, (iv) a bottom attachment, the bottom attachment being configured to receive the cable track assembly, (v) a top attachment, the top attachment being configured to connect to the bottom attachment, and (vi) a plurality of wires, the plurality of wires configured to be received by the cable track assembly; and (b) a scale, the scale including:

(i) a platform scale, and (ii) a top plate, the top plate being configured to be mounted on the platform scale, wherein the cable management assembly is connected to the scale such that the plurality of wires are connected to the scale, and wherein the cable management assembly is configured to route the plurality of wires through the cable track assembly directly into the scale to maintain continuous power and communication between the cable management assembly and the scale as the basket scale assembly moves relative to an associated storage unit system.

20. A storage system, the storage system:

(a) at least one cabinet;

(b) a plurality of racks positioned within the at least one cabinet;

(c) the basket scale assembly of claim 1, the basket scale assembly configured to attach to at least one of the racks; and (d) a plurality of holders, the plurality holders being configured to hold at least one container containing medical supplies, each of the holders being supported by the basket scale assembly.

\* \* \* \* \*